Feb. 26, 1924.
H. M. HILL
FEED HOPPER FOR PLASTIC MATERIALS
Filed Aug. 30, 1922
1,484,945
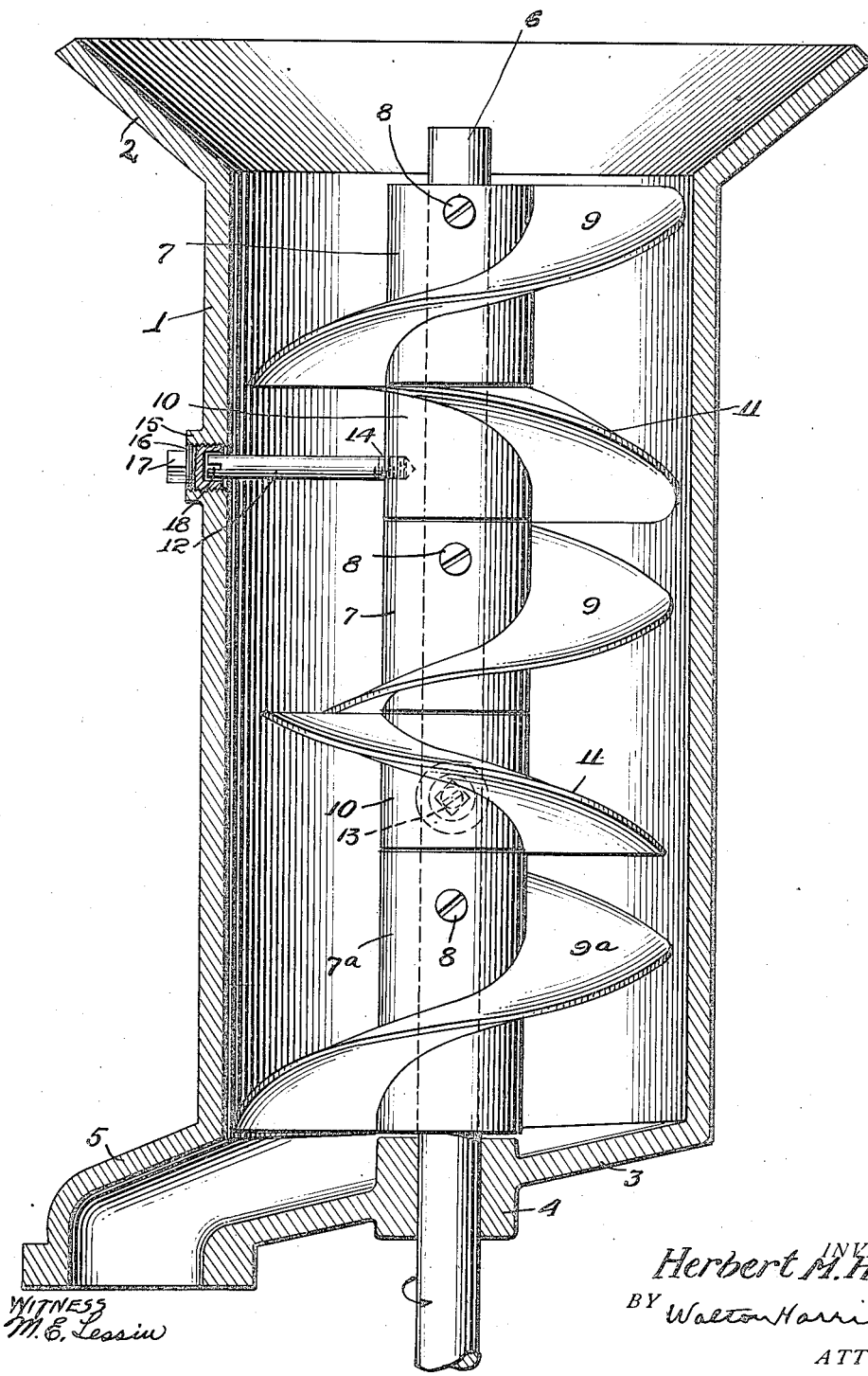
WITNESS
M. E. Lessin
INVENTOR
Herbert M. Hill
BY Walton Harrison,
ATTORNEY Patented Feb. 26, 1924.

1,484,945

UNITED STATES PATENT OFFICE.

HERBERT MORTIMER HILL, OF NEW YORK, N. Y., ASSIGNOR TO PHENIX CHEESE COMPANY, A CORPORATION OF NEW YORK.

FEED HOPPER FOR PLASTIC MATERIALS.

Application filed August 30, 1922. Serial No. 585,329.

*To all whom it may concern:*

Be it known that I, HERBERT MORTIMER HILL, a citizen of the United States, a resident of New York, in the county of New York and State of New York, have invented certain new and useful Improvements in Feed Hoppers for Plastic Materials, of which the following is a full, clear, and concise description.

My invention relates to feed hoppers for plastic materials, the purpose of my improvement being to enable the plastic materials to be forced through the hopper and outwardly therefrom under a moderate pressure, and without clogging the hopper.

More particularly stated, my invention relates to feed hoppers of a type suitable for use with soft cheeses and the like, for the purpose of enabling them to be readily done up in packages, and my main purpose is to prevent the material from finding lodgement in the hopper.

As is well known in this art, it is common practice to feed a plastic material through a hopper, the material being propelled or forced through by means of a spiral conveyor; but a very common trouble with apparatus of this kind is that the rotation of the spiral conveyor may at times cause a portion of the plastic material to rotate with it, the portion thus affected becoming detached from the mass of the plastic material being fed through, so that the conveyor ceases to force the plastic material through the hopper. A prominent object of my invention is to prevent the plastic material from rotating with the spiral conveyor or its equivalent, and to enable the material to be fed through the hopper positively and under a moderate pressure, as well as at a uniform rate.

Another object of my invention is to render readily accessible various parts of the feed mechanism within the hopper, for purposes of inspection and repair, and to facilitate replacement of the parts when broken or worn out.

A further object of my invention is to allow a certain amount of flexibility to certain parts located within the hopper, and thus to allow undesirable strains, set up in the working of the plastic material, to distribute themselves automatically and in such manner as to protect certain of the mechanical parts and to render the running of the mechanism somewhat easier.

Other objects of my invention are stated below in connection with the detailed description.

Reference is made to the accompanying drawing forming a part of this specification, and in which the figure is a substantially central vertical section through a feed hopper for plastic materials, as made in accordance with my invention.

The hopper is shown 1, and has a general cylindrical form. The hopper is provided at its upper end with a flaring portion 2, and is also provided at its lower end with a slanting bottom 3. This bottom is provided with a bearing 4, and with an outlet pipe 5.

A revoluble shaft 6 extends through the bearing 4, and upwardly through the hopper. Mounted upon the shaft 6 are hubs 7, 7, 7ª, each secured rigidly upon the shaft by a screw 8. The two hubs 7 each differ from the hub 7ª merely in being a little shorter than the latter. Each hub 7 carries an interrupted spiral thread 9. The hub 7ª is similarly provided with an interrupted spiral thread 9ª, which is somewhat longer than either of the interrupted threads 9.

Two other hubs 10 encircle the shaft 6, upon which they fit loosely but neatly. One of the hubs 10 is located between the two hubs 7, 7, the other hub 10 being located between the hub 7ª and the adjacent hub 7. Each hub 10 is provided with an interrupted spiral thread 11.

The three hubs 7, 7, 7ª rotate with the shaft 6, but the two hubs 10 do not. In order to prevent the hubs 10 from turning, I provide them respectively with holding pins 12, 13. These holding pins extend radially outward at different angles, but are otherwise exactly alike. Hence only one of them, namely the one numbered 12, is described completely or shown in full. The holding pin is provided with a threaded end portion 14, which is inserted in a hole in the hub, and tightened.

Associated with each holding pin is a circular boss 15, with which the hopper is provided. A hollow nut 16, threaded externally and provided with an angular head 17, is fitted into a hole extending through the boss 15 and the casing wall upon which this boss is mounted. The angular head 17 is of suitable form to be engaged by a wrench for the purpose of turning the nut, and the nut is turned for the purpose of removing, replacing or adjusting it in position. The holding pin 12 is at its outer end provided with a slot 18, into which a screw driver may be thrust for the purpose of turning the pin.

The operator, by removing the nut, can obtain access to the outer end of the holding pin: and then by inserting a screw driver into the slot 18, he can turn holding pin, for purposes of adjustment, removal, or replacement of the holding pin.

With the parts fitted in position and properly adjusted, the hollow nut fits neatly but not tightly over the outer end of the holding pin.

Thus each holding pin prevents rotation of the hub 10 upon which it is mounted, and yet allows the hub a very slight freedom of movement, so that the hub may rock slightly, if need be, in order to allow for slight distortions or other malformations of the shaft—or, in other words, to obtain for each hub 10 the mechanical advantages due to a small amount of flexibility in its mounting.

The shaft 6 may thus have a slight rocking movement, or perhaps more accurately a slight orbital movement; which is hardly appreciable to the senses, but is of considerable value in preventing undue wear and tear of the moving parts, and in lessening the chances for breakage of these parts.

The sole purpose of the holding pins 12, 13, is to prevent the hubs 10 from turning, and for this purpose the holding pins coact with the interrupted spiral thread 11; and also, in a remote degree, with the interrupted spiral threads 9, 9ª. Each thread 11 is so located and arranged that its middle portion is directly opposite one of the holding pins. Such being the case, and each spiral thread 11 fitting neatly within the cylindrical body portion of the hopper, it follows that no matter what position may be assumed by the spiral threads 9, 9ª, the shaft 6 cannot be displaced to any appreciable extent from its normal central position, under working conditions.

Under normal working conditions, the shaft 6 is turned in the direction indicated by the arrow. The threads 9, 9, 9ª are right-handed, and in this respect are alike. The threads 11 are left-handed, and hence alike, but of contrary direction to the threads 9, 9, 9ª. Thus in the particular instance here illustrated a number of right-handed fragmentary threads are revoluble relatively to a number of left-handed fragmentary threads which are prevented from turning.

The operation of my device is as follows:

The plastic material to be operated upon is placed in the flaring portion 2 of the hopper, and thus brought into engagement with the thread 9 immediately adjacent this flaring portion. The shaft being turned in the direction indicated by the arrows, the plastic material is forced downwardly and into engagement with the adjacent spiral thread 11. As the plastic material passes downwardly each successive spiral thread which it encounters, whether the thread be stationary or in motion, has a tendency to force the material downwardly, at least under ordinary working conditions.

For the reasons above stated it is impracticable for a quantity of the plastic material to find lodgment within the hopper so as not to be displaceable in consequence of the rotation of the shaft and the parts carried thereby. In other words it is impracticable for a mass of the plastic material to stick to the fragmentary threads which rotate bodily with the shaft, and thus to be carried bodily around without descending. The fixed threads 11, because of their form and location, and of the manner in which they coact with the threads which are turned by the revoluble shaft serve effectively to prevent the plastic material from clogging. The net result is that the plastic material is fed downwardly at a substantially uniform rate of speed for a given speed of shaft rotation, and is discharged through the outlet pipe 5 under a moderate pressure.

I do not limit myself to the particular mechanism illustrated and described, as variations may be made therein without departing from my invention, the scope of which is defined by my claims.

Having thus described my invention, what I claim as new and desire to secure by Letters Patent is as follows:

1. A feed hopper for plastic materials, comprising a cylinder, a revoluble shaft located therein and positioned approximately in the axial center thereof, an interrupted thread mounted upon said shaft and revoluble therewith, and another interrupted thread located within said cylinder and in proximity to said first mentioned thread, said second mentioned thread being fixed against rotation.

2. In a feed hopper for plastic material the combination of a cylinder, a feed member revolubly mounted therein and having the form of a thread, a second feed member mounted within said cylinder and in proximity to said first-mentioned feed member, said second-mentioned feed member having the form of a thread, one of said threads being right-handed and the other of said threads being left-handed, and means for preventing said second mentioned feed member from turning relatively to said first-mentioned feed member.

3. In a feed hopper for plastic materials the combination of a cylinder, a revoluble shaft mounted therein, a plurality of hubs mounted upon said shaft and revoluble therewith, said hubs being spaced apart, a fragmentary feed thread carried by each hub, a plurality of other hubs mounted loosely upon said shaft and spaced apart, said last-mentioned hubs being disposed intermediate said first-mentioned hubs and therewith alternated in position, a fragmentary thread carried by each of said second-mentioned hubs, the threads carried by said second-mentioned hubs having a different direction of twist from the threads carried by said first-mentioned hubs, and means for preventing said second-mentioned hubs from rotating.

4. In a device of the character described the combination of a hollow feed member, a revoluble shaft mounted therein, a hub mounted rigidly upon said revoluble shaft and revoluble therewith, a second hub fitted loosely upon said shaft, means for preventing said second hub from rotating with the shaft, a fragmentary thread mounted upon one of said hubs and another fragmentary thread mounted upon the other of said hubs, one of said threads being right-handed and the other being left-handed.

5. In a feed hopper for plastic materials the combination, with a revoluble feed thread and a revoluble shaft for supporting and turning said feed thread, of a hub fitted loosely upon said revoluble shaft, an interrupted feed thread mounted upon said hub and coacting with said revoluble feed thread, and means for preventing said hub from turning with said revoluble shaft.

6. In a feed hopper for plastic materials the combination of a hollow feed member, a revoluble shaft mounted within said hollow feed member, a fragmentary feed thread carried by said shaft and revoluble therewith, a hub fitted upon said shaft and loose relatively thereto, a fragmentary feed thread mounted upon said hub and coacting with said first-mentioned fragmentary feed thread, a pin secured to said hub and extending radially therefrom, and means for preventing said pin from turning as the shaft is rotated.

7. In a feed hopper for plastic material the combination of a hollow feed member, a revoluble shaft mounted within said hollow feed member, a fragmentary feed thread carried by said shaft and revoluble therewith, a hub fitted upon said shaft and loose relatively thereto, a fragmentary feed thread mounted upon said hub and coacting with said first-mentioned fragmentary feed thread, a pin secured to said hub and extending radially therefrom; and a hollow nut mounted upon said hollow feed member and loosely engaging one end of said pin.

8. In a feed hopper for plastic materials the combination of a hollow feed member, a revoluble shaft mounted within said hollow feed member, a fragmentary feed thread carried by said shaft and revoluble therewith, a hub fitted upon said shaft and loose relatively thereto, a fragmentary feed thread mounted upon said hub and coacting with said first-mentioned fragmentary feed thread, a pin secured to said hub and extending radially therefrom, and mechanism loosely engaging said pin for the double purpose of preventing said pin from turning as the shaft is rotated and allowing the pin a limited rocking movement.

9. In a device of the character described the combination of a hopper member provided with a wall and with a hole threaded internally and extending through said wall, a hollow nut threaded externally and revolubly fitted into said hole, said nut being adjustable relatively to said wall, a fragmentary thread supported by said shaft and revoluble therewith, a hub fitted loosely upon said shaft and provided with a feed member mating said thread and coacting therewith, and a holding pin mounted upon said hub and extending into said hollow nut, so that the operator, by removing said hollow nut, can obtain access to the adjacent end of said holding pin.

10. In a device of the character described the combination of a hopper member provided with a wall and with a hole threaded internally and extending through said wall, a hollow nut threaded externally and revolubly fitted into said hole, said nut being adjustable relatively to said wall, a revoluble shaft located within said hopper member, a fragmentary thread supported by said shaft and revoluble therewith, a hub fitted loosely upon said shaft and provided with a feed member mating said thread and coacting therewith, and a holding pin mounted upon said hub and having a threaded connection therewith, so that said holding pin may be adjusted by turning it relatively to said hub, said holding pin extending loosely into said hollow nut, so that the operator, by removing said hollow nut, can obtain access to the adjacent end of said holding pin.

HERBERT MORTIMER HILL.